United States Patent
Beier et al.

(10) Patent No.: US 10,248,695 B2
(45) Date of Patent: *Apr. 2, 2019

(54) EXTREME VALUE COMPUTATION

(71) Applicant: INTERNATIONAL BUSINESS MACHINES CORPORATION, Armonk, NY (US)

(72) Inventors: Felix O. Beier, Holzgerlingen (DE); Thomas F. Boehme, Boeblingen (DE); Andreas Brodt, Gerlingen (DE); Oliver Schiller, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 15/161,396

(22) Filed: May 23, 2016

(65) Prior Publication Data

US 2017/0337245 A1    Nov. 23, 2017

(51) Int. Cl.
*G06F 17/30* (2006.01)

(52) U.S. Cl.
CPC .. *G06F 17/30501* (2013.01); *G06F 17/30404* (2013.01)

(58) Field of Classification Search
CPC .............. G06F 17/30501; G06F 17/30; G06F 17/30404
See application file for complete search history.

(56) References Cited

U.S. PATENT DOCUMENTS

| | | | |
|---|---|---|---|
| 8,549,004 B2 * | 10/2013 | Lakshminarayan | ........................ G06F 17/30536 707/737 |
| 8,626,725 B2 | 1/2014 | Netz et al. | |
| 2008/0162441 A1 * | 7/2008 | Kirk | ................. G06F 17/30486 |
| 2009/0106210 A1 | 4/2009 | Slezak et al. | |
| 2011/0246432 A1 | 10/2011 | Yang et al. | |
| 2012/0254199 A1 | 10/2012 | Kuno et al. | |
| 2014/0095502 A1 | 4/2014 | Ziauddin et al. | |

(Continued)

OTHER PUBLICATIONS

IBM: List of IBM Patents of Patent Applications Treated as Related (Appendix P), Oct. 13, 2017, pp. 1-2.

(Continued)

*Primary Examiner* — Kristopher Andersen
(74) *Attorney, Agent, or Firm* — Michael O'Keefe

(57) ABSTRACT

The method may include providing a plurality of synopsis techniques for determining a plurality of attribute value information indicative of the at least one attribute. The method may include determining a data characteristic describing the plurality of data rows of the current data block. The method may include selecting, based on the determined data characteristic, at least one synopsis technique of the provided plurality of synopsis techniques suitable for generating the plurality of attribute value information for the at least one attribute of the current data block. The method may include determining the plurality of attribute value information for the at least one attribute of the plurality of data rows of the current data block using the at least one selected synopsis technique. The method may include storing the determined plurality of attribute value information for the current data block to be used for query processing against the data table.

14 Claims, 2 Drawing Sheets

(56) References Cited

U.S. PATENT DOCUMENTS

| | | | |
|---|---|---|---|
| 2014/0095520 | A1 | 4/2014 | Ziauddin et al. |
| 2015/0199407 | A1 | 7/2015 | Ziauddin et al. |
| 2015/0286681 | A1 | 10/2015 | Baer et al. |
| 2015/0286682 | A1 | 10/2015 | Ziauddin |
| 2015/0347426 | A1 | 12/2015 | Dickie et al. |
| 2015/0363447 | A1 | 12/2015 | Dickie |

OTHER PUBLICATIONS

Beier et al., Pending U.S. Appl. No. 15/711,026, filed Sep. 21, 2017, titled "Extreme Value Computation", pp. 1-40.

Bayliss et al., "Zone Map and Attribute Clustering Examples," Oracle Data Warehousing and Very Large Databases, Last Modified on Jul. 31, 2014, p. 1-3, GitHub, Inc., https://github.com/oracle/dw-vldb/tree/master/att_clu_zone_map, Accessed on Apr. 29, 2016.

Bloom, "Space/Time Trade-offs in Hash Coding with Allowable Errors," Communications of the ACM, Jul. 1970, p. 422-426, vol. 13, Issue 7.

Boehme et al., "Executing Conditions With Negation Operators in Analytical Databases," Application and Drawings, filed Oct. 27, 2015, 48 Pages, U.S. Appl. No. 14/923,690.

Boehme et al., "Method for Storing a Dataset," Application and Drawings, filed Nov. 18, 2015, 43 Pages, U.S. Appl. No. 14/944,256.

Bonomi et al., "An Improved Construction for Counting Bloom Filters," Algorithms—ESA 2006, 2006, p. 684-695, LNCS 4168, Springer-Verlag Berlin Heidelberg.

Ensslen, "Redshift Zone Maps as an 'Indexing' Strategy," Optimal Business Intelligence Blog, Dec. 8, 2014, p. 1-4, OptimalBI Ltd., http://optimalbi.com/blog/2014/12/08/redshift-zone-maps-as-an-indexing-strategy/, Accessed on Apr. 29, 2016.

Gardi, "Efficient Algorithms for Disjoint Matchings among Intervals and Related Problems," Discrete Mathematics and Theoretical Computer Science, 2003, p. 168-180, LNCS 2731, Springer-Verlag Berlin Heidelberg.

Oracle, "Attribute Clusters and Zone Maps," Oracle Database 12c Tutorial, p. 1-27, http://www.oracle.com/webfolder/technetwork/tutorials/obe/db/12c/r1/12c_aczm/12c_aczm.html, Accessed on May 4, 2016.

Oracle, "Partition Pruning with Zone Maps," Oracle Database VLDB and Partitioning Guide, p. 1-2, Oracle Database Online Documentation 12c Release 1 (12.1), Chapter 3, https://docs.oracle.com/database/121/VLDBG/GUID-65DA5654-970B-4056-BFBF-C300C9A8AA2A.htm#VLDBG14101, Accessed on May 2, 2016.

Oracle, "Using Zone Maps," Oracle Database Data Warehousing Guide, p. 1-24, Oracle Database Online Documentation 12c Release 1 (12.1), Chapter 13, http://docs.oracle.com/database/121/DWHSG/zone_maps.htm#DWHSG9355, Accessed on Apr. 29, 2016.

Ślęzak, "Brighthouse: An Analytic Data Warehouse for Ad-hoc Queries," PVLDB '08, Aug. 23-28, 2008, p. 1337-1345, VLDB Endowment, ACM, Auckland, New Zealand.

\* cited by examiner

EXTREME VALUE COMPUTATION

BACKGROUND

The present invention relates to the field of digital computer systems, and more specifically, to a method for storing a data table.

Analytical database systems manage very large amounts of data and are optimized for queries that must read large portions of it. At the same time, they offer the complete querying power of Structured Query Language (SQL). As such systems do not focus on on-line transaction processing (OLTP) load (i.e. involving point queries), the systems typically do not index each data row but heavily rely on scan performance. Hence, there is a continuous need to improve scan performance in analytical database systems.

SUMMARY

According to one embodiment, a method for storing a data table is provided. The method may include providing a plurality of synopsis techniques for determining a plurality of attribute value information indicative of the at least one attribute. The method may also include determining a data characteristic describing the plurality of data rows of the current data block. The method may further include selecting, based on the determined data characteristic, at least one synopsis technique of the provided plurality of synopsis techniques suitable for generating the plurality of attribute value information for the at least one attribute of the current data block. The method may also include determining the plurality of attribute value information for the at least one attribute of the plurality of data rows of the current data block using the at least one selected synopsis technique. The method may further include storing the determined plurality of attribute value information for the current data block to be used for query processing against the data table.

According to another embodiment, a computer system for processing a data table is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include providing a plurality of synopsis techniques for determining a plurality of attribute value information indicative of the at least one attribute. The method may also include determining a data characteristic describing the plurality of data rows of the current data block. The method may further include selecting, based on the determined data characteristic, at least one synopsis technique of the provided plurality of synopsis techniques suitable for generating the plurality of attribute value information for the at least one attribute of the current data block. The method may also include determining the plurality of attribute value information for the at least one attribute of the plurality of data rows of the current data block using the at least one selected synopsis technique. The method may further include storing the determined plurality of attribute value information for the current data block to be used for query processing against the data table.

According to yet another embodiment, a computer program product for processing a data table is provided. The computer program product may include one or more computer-readable storage devices and program instructions stored on at least one of the one or more tangible storage devices, the program instructions executable by a processor. The computer program product may include program instructions to provide a plurality of synopsis techniques for determining a plurality of attribute value information indicative of the at least one attribute. The computer program product may also include program instructions to determine a data characteristic describing the plurality of data rows of the current data block. The computer program product may further include program instructions to select, based on the determined data characteristic, at least one synopsis technique of the provided plurality of synopsis techniques suitable for generating the plurality of attribute value information for the at least one attribute of the current data block. The computer program product may also include program instructions to determine the plurality of attribute value information for the at least one attribute of the plurality of data rows of the current data block using the at least one selected synopsis technique. The computer program product may further include program instructions to store the determined plurality of attribute value information for the current data block to be used for query processing against the data table.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
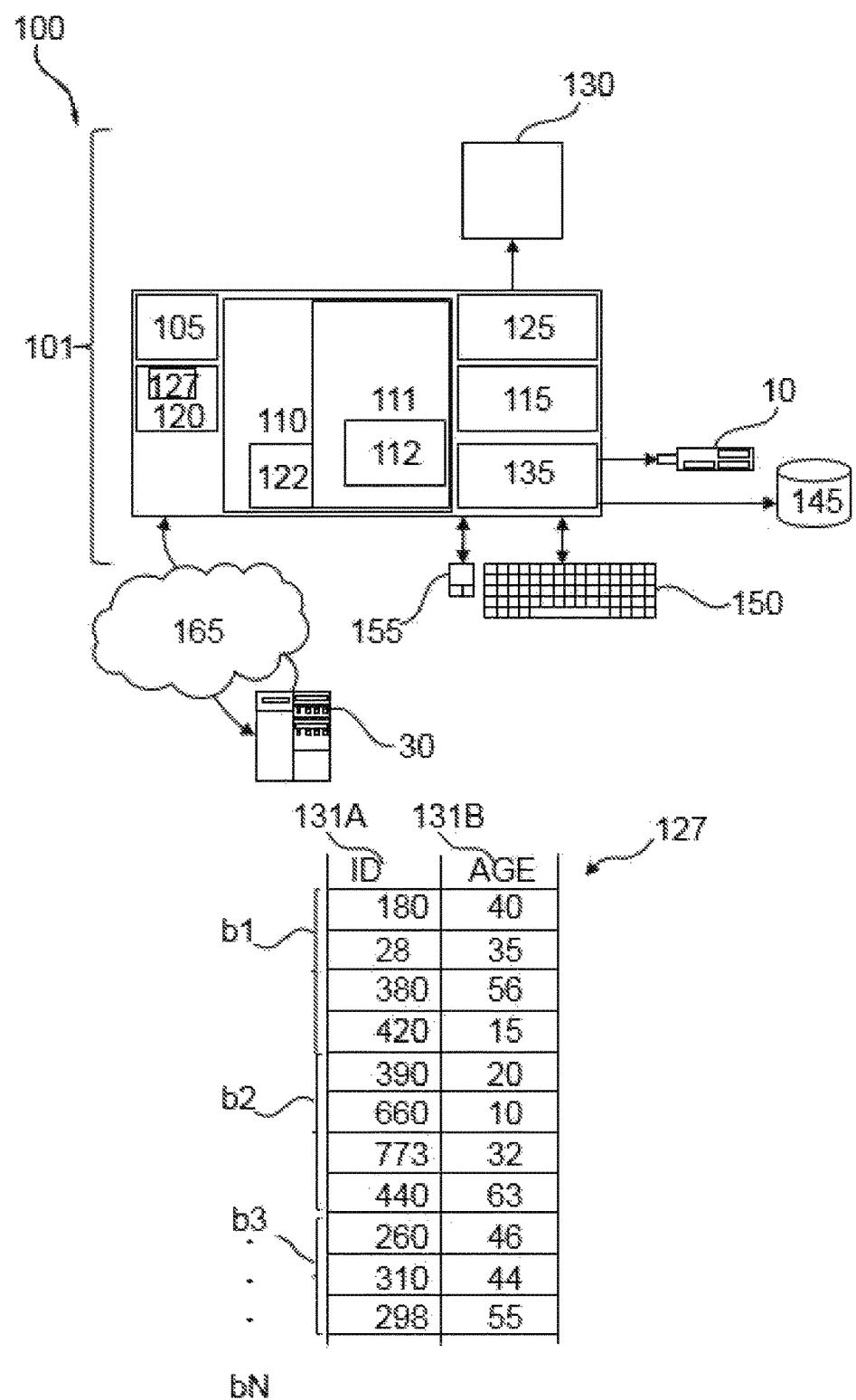
FIG. 1 represents a computerized system, suited for implementing one or more method steps as involved in the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may have the advantage of reducing the false positive rates caused by gaps in the value distribution of attributes with few distinct values (e.g. false positive: data block is accessed but contains no rows matching the query predicate). A gap is a range of values of the attribute, whereby the attribute of a given data block has no value within the gap.

The present method may be a key performance enabler for analytical database systems, as it may massively save disk input/output (I/O) and central processing unit (CPU) resources.

The present method may be repeated for each data block of the data table. This may result in each data block of the data table being associated with an entry that contains the respective attribute value information.

The attribute value information may be descriptive of the attribute. Using the attribute value information a preselection of data blocks of the data table may be performed before scanning the preselected data blocks. The attribute value information may comprise information or metadata on the attribute that allows such a preselection. In one example, the attribute value information may comprise at least one of minimum attribute value of the attribute in the first data block and maximum attribute value of the attribute of the first data block.

For example, the maximum and the minimum attribute values define a first range of values of the attribute in a respective first data block. For example, a received data query may require a second range of values of the attribute. The processing of the data query may comprise selecting data blocks of the data table whose respective first range overlap with the second range and processing those selected data blocks (that forms a scan list).

The term "data block" as used herein may refer to a logical or physical storage unit for storing the data of the data table. The data block may be the smallest storage unit that is handled by a database management system or an operating system of the computer system.

For example, in the present method when the data is loaded (e.g. in form of data blocks), the present method may be performed on the fly for each data block of at least part of the data blocks. The computer system may determine the synopsis technique that best fits data characteristics of each data block. Thus, this may lead to different data blocks having different synopsis techniques. For some data blocks, the extremum values may be a good fit. For data blocks with few distinct values, on the other hand, it may be more suitable to store the list of values that occur in this particular data block. For yet other data blocks, a small Bloom filter combined with the extremum values may approximate the value distribution in the data block best. Other synopsis techniques may be integrated similarly.

In other words, the present method may, for example, include the following steps when the data is loaded into a data block bN or where a data block is stored:
  i. compute the data required for every synopsis technique;
  ii. determine the data characteristics within the data block bN;
  iii. decide on one particular synopsis technique to use for the data block bN; and
  iv. when bN is complete, store the data (e.g. the attribute value information) required for the chosen synopsis technique as entry associated with bN.

When a query computes the list of data blocks to scan (i.e. the scan list) using the attribute value information, it may be configured to interpret that entry of every data block differently. Thus, it first determines the synopsis technique employed for a data block. Then the query predicates are evaluated against the respective entry according to the employed technique to decide whether or not the data block must be scanned.

According to one embodiment, the data characteristic includes the number of distinct values of the attribute. The selecting of the synopsis technique includes comparing the number of distinct values with a predetermined threshold and selecting the synopsis technique based on the result of comparison.

This may provide a time saving and simplified method for determining the attribute value information as no extra or complicated calculations are required for generating the data characteristics. This may involve the comparison of two values only. In this way, the present embodiment may enable an efficient use of the computer system by executing the present embodiment on a hardware component of the computer system, such as a field-programmable gate array (FPGA).

According to one embodiment, the method further comprises in response to determining that the number of distinct values is smaller than the predetermined threshold, selecting an in-list technique of the set of synopsis techniques, wherein determining the attribute value information comprises providing the attribute value information as the distinct values of the attribute.

Having the distinct values as the attribute value information may further increase the processing efficiency of data blocks of the data table. The number of false positives or unnecessary scanned data blocks may be reduced.

According to one embodiment, the attribute value information is stored in a memory, wherein the threshold comprises a maximum number of memory units. The storage of the attribute value information on a main memory may have the advantage of speeding up the process of defining the scan list using the attribute value information. By controlling or tuning the predefined threshold, the present method may provide a balance between the advantage of using the distinct values and the physical limitation of the memory.

According to one embodiment, in response to determining that the number of distinct values is higher than the predetermined threshold selecting a bloom filter technique of the set of synopsis techniques, whereby determining the attribute value information includes inserting each value of the attribute of the current data block into a bit of a bit vector, whereby the attribute value information comprises at least the bit vector. The bit vector or bit array may provide a more space-efficient storage of the attribute value information while enabling to reduce the number of unnecessary scanned data blocks.

The inserting of the attribute value into a bit of the bit vector may be performed using one or more different hash functions defined, each of which maps or hashes the attribute value to one of the bit vector positions. For example, to add an attribute value to the bit vector, the attribute value may be fed to the hash function to get array position where to set the bit representing the occurrence of the attribute value.

According to one embodiment, the attribute value information further includes the extremum values of the attribute. This may further reduce the number of unnecessary data blocks scans.

According to one embodiment, the determining of the attribute value information includes scanning the current data block and identifying a fixed number j of first distinct values of the attribute for indicating a value range of the attribute in the current data block; dividing the value range into multiple sub-ranges; and creating a distribution of buckets each associated with a respective sub-range of the subranges. The method includes further scanning the current data block and, for each further current value j+1 of the attribute, determining if a bucket is available, and, if so, marking the bucket as a non-empty bucket and providing the attribute value information as including the extremum values of the attribute in the current data block, the buckets and the range of attribute values in each of the buckets. The distribution of buckets may, for example, include a histogram.

This embodiment may enable a more space-efficient storage of the attribute value information in particular in a scenario with a high number of distinct values in a large value range of the attribute.

According to one embodiment, the method further includes receiving a query on the attribute of the data table;

determining the number of empty buckets of the distribution of buckets; comparing the determined number with a predetermined maximum number of empty buckets; and based on the comparison result using one of the distribution of buckets and the extremum values for, deciding to scan or not to scan the current data block for evaluating the query. The advantage of further adding the extremum values to the attribute value information may provide a fallback position in case of selectivity issues with the distribution of buckets such as a histogram.

According to one embodiment, the set of synopsis techniques includes a default synopsis technique for providing the attribute value information as the extremum values of the attribute of the set of data rows of the current data block, the method further including: assigning to each synopsis technique of the set of synopsis techniques other than the default technique a selection criterion to be fulfilled by values of the attribute in order to use the each synopsis technique; whereby the selecting of the synopsis technique includes in response to determining that none of the selection criteria is fulfilled selecting the default synopsis technique. This may ensure that a minimum requirement on the number false positives is fulfilled.

According to one embodiment, the method further includes: assigning a tag to each technique of the set of synopsis techniques; storing the tag of the selected synopsis technique in association with the attribute value information; receiving a query on the attribute of the data table; reading the tag for interpreting the attribute value information in accordance with the selected technique; and using the attribute value information for deciding to scan or not scan the current data block for evaluating the query. This may save processing resources that would otherwise be required for a blind analysis of the attribute value information.

According to one embodiment, second data blocks of the data table include respective second set of data rows of the data table. The method further includes repeating steps for each of the second data blocks as the current data block; grouping the resulting attribute value information of the first and second data blocks based on the respective used synopsis technique; assigning to each group a tag indicating the synopsis technique used for the group; receiving a query on the attribute of the data table; and using the attribute value information group by group by reading the respective tag for interpreting the attribute value information of the group in accordance with the synopsis technique of the group to determine a scan list of data blocks to be scanned for evaluating the query. This may further save processing resources that would otherwise be required for processing each tag of the attribute value information.

According to one embodiment, the method is executed on a hardware component of a computer system, the hardware component including an FPGA. This may make use of hardware advantages of FPGAs.

According to one embodiment, the determining of the data characteristic is performed using metadata descriptive of the overall structure of the data table. This may save time of processing data characteristics for each data block.

According to one embodiment, the set of synopsis techniques includes an in-list technique, a Bloom filter technique and a default technique. The default technique provides the attribute value information as the extremum values of the attribute. The in-list technique provides the attribute value information as the distinct values of the attribute. The Bloom filter provides the attribute value information as a bit vector to represent the attribute values (as described above). The steps are performed while scanning row by row the first data block and include:

assigning a counter to the attribute,
for a current scanned row:
inserting a value of the attribute of the current row into a bit of a bit vector,
updating the data characteristic whereby the data characteristic includes the counter and the number of filled bits of the bit vector;
determining if the value of the attribute of the row is a distinct value,
if the value of the attribute of the current row is a distinct value comparing the counter with a predefined maximum number of distinct values;
in case the counter is smaller than the predefined maximum number of distinct values saving the distinct value in the memory, incrementing the counter by a predefined value and, in case the current row is the last row of the current data block, selecting the in-list technique,
in case the counter is higher than the predefined maximum number of distinct values, discarding the stored distinct values from the memory;
in case the number of filled bits in the bit vector is smaller than a predetermined maximum number of bits and in case the current row is the last row of the current data block, selecting the bloom filter technique,
in case the number of filled bits in the bit vector is higher than the predetermined maximum number of bits, discarding the bit vector and selecting the default technique,
upon finishing the scanning of the current data block, providing the attribute value information using the selected technique.

In another example, the set of synopsis techniques further includes a histogram technique. The provision of the attribute value information using the selected technique includes:
determining the number of gaps in the range of values of the attribute of the current data block, whereby a gap covers values of the attribute that are not part of the current data block, in case the number of gaps is higher than a predetermined maximum number of gaps further switching from the default technique to the histogram technique and providing the attribute value information using the histogram technique.

The extremum values may be calculated on the fly as well, such as while scanning row by row. This embodiment may provide an efficient on the fly execution of the present method.

According to one embodiment, the range of values of the attribute includes sub ranges separated by gaps, whereby each sub-range of the sub-ranges covers values of the attribute that are part of the first data block, whereby each gap of the gaps covers values of the attribute that are not part of the current data block, whereby the data characteristic includes the number of distinct values and/or the number of gaps. This may further increase the selection efficiency of the scan list using the attribute value information.

According to one embodiment, the method further includes, in response to determining that the range of values is smaller than a predefined maximum range of values of the attribute and that the number of gaps is smaller than a predetermined maximum number of gaps, selecting a default synopsis technique of the set of synopsis techniques, whereby determining the attribute value information includes providing the attribute value information as including the extremum values of the attribute in the current data block.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100, therefore, includes a general-purpose computer 101.

In exemplary embodiments, in terms of hardware architecture, as shown in FIG. 1, the computer 101 includes a processor 105, memory (main memory) 110 coupled to a memory controller 115, and one or more I/O devices (or peripherals) 10, 145 that are communicatively coupled via a local input/output controller 135. The I/O controller 135 can be, but is not limited to, one or more buses or other wired or wireless connections, as is known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a CPU, an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 (e.g. instructions to manage databases, such as a database management system). The memory 110 may further comprise a query optimizer. The query optimizer may comprise instructions (e.g. software instructions that when executed may provide a query execution plan for executing a given query).

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, etc., which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the I/O controller 135. Other output devices, such as the I/O devices 145, may include input devices, for example but not limited to a printer, a scanner, microphone, etc. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, etc. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client, etc. via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer (PC), workstation, intelligent device, etc., the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may include at least one data table (or data set) 127. For example, the software 112 may receive (automatically or upon request) as input the data table 127, or may download the data table 127 from storage 120 or memory 110.

The data table 127 may include one or more columns 131A-B, wherein each column is represented by a respective attribute (e.g. "ID" 131A and "Age" 131B). The rows of the data table 127 may include values of the attributes. The data table 127 may for example include or may be stored on multiple (e.g. contiguous) data blocks b1-bN.

For example, as illustrated in FIG. 1, the data table 127 may be divided or split or assigned to data blocks b1-bN using the number of rows in the data table 127.

In another example, the data table 127 may be split or divided based on storage size such that each data block b1-bN contains or is assigned to one or more storage units (e.g. data pages). The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may include containers and extents, whereby extents can be defined in term of number of data pages, while a container can be determined in term of number of extents.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not include the same number of data pages.

The term "data table" or data set as used herein refers to a collection of data that may be presented in tabular form. Each column in the data table may represent a particular variable or attribute. Each row in the data table may represent a given member, record, or entry of the data table.

While FIG. 1 only shows a few attributes and data blocks, it will be appreciated that numerous attributes and/or data blocks may exist or may be used.

Figure 2:
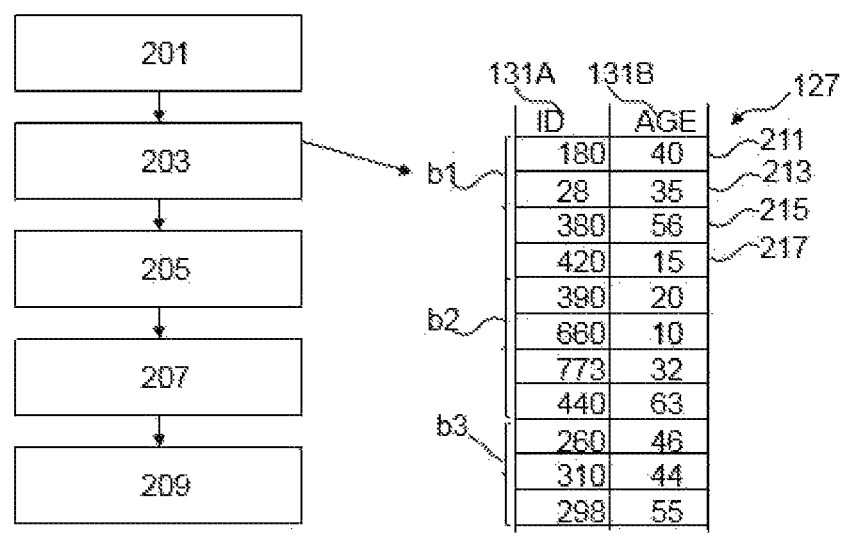
FIG. 2 is a flowchart of a method for storing a data table.

FIG. 2 is a flowchart of a method for storing a data table e.g. data table 127. The data table has or includes at least one attribute 131A-B. A first data block (e.g. b1) of the data table 127 includes a set of data rows of the data table 127. In the example shown in FIG. 1, the set of records or rows of b1 includes rows 211-217.

In step 201, a set of synopsis techniques may be provided for determining attribute value information indicative of the attribute 131B. The term "technique" as used herein, may refer, for example, to series or steps or processes (e.g. computer-readable instructions) that receive an input and provide an output. For example a technique may receive as input a given number of attribute values (e.g. by scanning a data block) for a given attribute and may produce attribute value information that describe the attribute.

The set of synopsis techniques may, for example, be stored in the form of one or more files (e.g. in memory 110) containing an indication of each of the synopsis techniques. The set of synopsis techniques may, for example, be received at the computer system 100 as inputs from a user of the computer system. In another example the set of synopsis techniques may be generated or selected at the computer system 100 using predefined techniques.

In step 203, a data characteristic describing the set of data rows of the first data block may be determined. The first data block may be a current data block being processed by the present method.

The data characteristic refers to information that identifies or characterizes the data table. For example, data characteristic may refer to information that identifies or characterizes attribute values of one or more attributes in the data table. In another example, the data may refer to information that identifies or characterizes attribute values of all attributes in the data table. For example, the data characteristic may include the number of distinct values of the attribute 131B.

In another example, the data characteristic may include metadata descriptive of the overall structure of the data table (i.e. not only the set of records or rows of the current data block but also remaining records of the data table are described by the data characteristic). This may enable to detect columns or attributes that are unlikely to benefit from a given synopsis technique as in the following examples:

columns (or attributes) which are defined as unique, as primary key (which implies unique), as distribution column, or as organizing column are known or likely to contain a huge number of distinct values. The same holds for system-generated column values involving a sequence or the auto-increment feature offered by some systems;

monotonously growing or declining attribute values across data blocks indicate that the corresponding columns contain large numbers of distinct values;

if the same column featured large numbers of distinct values in the past, this is unlikely to change in future data blocks. Thus, if this was the case for a column across many data blocks, the computer system may stop evaluating different synopsis techniques and use extremum values of the default technique; and the computer system may consult the statistics of the query optimizer. In many cases they contain an estimate on the number of distinct column values. If this number is larger than what typically works well with the discussed heuristics then the extremum values may be used directly.

The data characteristic may be stored in association with the data table 127 and may include an indication (e.g. row numbers of the set of records) of the first data block to which it is associated.

In one example, step 203 (and following steps 205-209) may be performed in response to receiving a query on the data table. The evaluation of the query may include the processing of data blocks of the data table, whereby processing the current data block may include step 203. This embodiment may provide an efficient use of resources by making use of processing the received query in order to perform the present method.

In another example, steps 203-209 may automatically be performed as soon as the data table is stored in the computer system.

Using the determined data characteristic, at least one synopsis technique of the synopsis techniques may be selected in step 205. The selected synopsis technique may be suitable for generating the attribute value information for the at least one attribute of the first data block. The attribute value information may be generated for one or more attributes of the first data block. The one or more attributes may be user defined or may be part or involved in a condition of a received query on the data table that triggers the steps 203-209. In another example, the synopsis techniques may be selected for attributes of the first data block that have a frequency access higher than a minimum access frequency threshold. In other words, an attribute which is not frequently queried or accessed may not be used for determining the synopsis technique and then the attribute value information. This may save processing resources such as storage and CPU.

In a further example, the attribute value information may be generated for all attributes of the first data block. For each attribute of the first data block, a synopsis technique may be selected in accordance with step 205.

A given synopsis technique may be associated with a selection criterion that may be defined, such that, when satisfied, the given synopsis technique may be selected. The selection criterion may be based on the data characteristic. Using the above example of distinct values, the selection criterion may include "the number of distinct values of a given attribute is smaller than a first predetermined threshold" and may be associated with an in-list technique of the set of synopsis techniques. The in-list technique when performed provides or generates the attribute value information as the distinct values of the attribute 131B. Using the data characteristic that describes the number of distinct values of the given attribute, the selection criterion may be evaluated and if satisfied the in-list technique may be selected.

In another example, the selection criterion may include "the number of distinct values of a given attribute is higher than a second predetermined threshold" and may be associated with a Bloom filter technique of the set of synopsis techniques. The Bloom filter technique, when performed, provides or generates the attribute value information by inserting each value of the attribute 131B of the first data block into a bit of a bit vector, whereby the attribute value information includes at least the bit vector. Using the data characteristic that describes the number of distinct values of the given attribute, the selection criterion may be evaluated and, if satisfied, the Bloom filter technique may be selected.

The first and second thresholds may or may not be equal. For example, if the first and second thresholds are different and it is determined that the number of distinct values of the given attribute is between the first and second thresholds, the default technique may be selected and may be used to generate the attribute value information for the given attribute.

In a further example, the selection criterion may include "the number of distinct values of a given attribute is higher than a third predetermined threshold and the range of values of the given attribute is higher than a predetermined range threshold" and may be associated with a histogram technique of the set of synopsis techniques, as described below, with reference to FIG. 3. For example, the third threshold may be higher than the first and second thresholds.

In an alternative example of the selection criterion example, using the metadata descriptive of the overall structure of the data table, a given column or attribute of the data table which is defined as unique, as primary key (which implies unique), as distribution column, or as organizing column may be identified. And, the default technique may be selected for this identified attribute. The default technique may generate the attribute value information as the extremum values of the attribute in the first data block.

Using the selected synopsis technique, the attribute value information may be determined in step 207 for the attribute of the set of data rows of the first data block.

In one example, the determined attribute value information of step 207 may further include the extremum values of the attribute. In other words, step 207 may include performing both the selected synopsis technique and the default technique. This may be advantageous in case the attribute value information as determined by the selected synopsis technique may have a low selection efficiency in that only very few data blocks may be skipped (not scanned) when using that information.

In step 209, the attribute value information for the first data block may be stored (e.g. in memory 110) in order to be used for query processing against the data table.

The attribute value information may be stored in contiguous storage. In this case, the system may add meta-information to the attribute value information. The meta-information denotes the synopsis technique employed for the attribute value information of each data block. The meta-information may, for example, include a tag (that indicates which part of the storage on which the attribute value information is stored) to allow a query to detect the synopsis technique employed for the current data block. The query will read the tag and interpret the attribute value information according to the stated technique. If all attribute value information for an attribute across all data blocks employ the same synopsis technique, the system can store only a global tag, thereby making entry-wise tag interpretation unnecessary.

Alternatively, the attribute value information for the same column may be grouped by their employed synopsis technique. In this case, the technique needs to be defined (e.g., in a tag) only once per group. A query computing a scan list may evaluate every group of attribute value information for the attribute and unite the scan lists computed on the individual groups. This can be implemented very efficiently, such as by using bit vectors for identifying data blocks that need to be scanned which can be combined with bit-wise operations that are supported by vectorized processor instructions.

In one example, steps 203-209 may be repeated for each data block of the data table 127. In another example, steps 203-209 may be performed for a part of the data blocks of the data table (e.g. only for the first data block). This may for example be useful for test purpose or other purpose where the full content of the data table may not be required.

For example, a query that is received on the data table and has a condition, the attribute for which the attribute value information has been determined, may be evaluated by first reading the attribute value information and deciding to scan or not to scan the first data block. The condition may be an inequality condition (e.g. smaller, between, or higher), equality condition, or a prefix search that may be pre-evaluated using the attribute value information so as to only scan the first data block, if it may contain records that satisfy the query. For that, the stored attribute value information may be tagged or associated with a tag that indicates the synopsis technique that has been used to generate the attribute value information. This tag may be read to determine which synopsis technique is used and based on the determined synopsis technique the attribute value information may be interpreted or used accordingly. For example, an application 112 that is used to process the query may include switches that enable switching between different selection conditions, whereby each selection condition is based on and associate to a respective type of attribute value information. Depending on the value of the tag the application may use one of the selection conditions.

Assuming for exemplification purposes that the query includes an inequality search e.g. "AGE=17". In case the tag of the attribute value information of the first data block indicates that the default technique is used then the selection condition to be used may be based on a comparison between the value "17" and the extremum values that are part of the attribute value information (e.g. if value "17" is not within the extremum values the first data block may not be selected for scanning in order to evaluate the query).

In case the tag of the attribute value information of the first data block indicates that the in-list technique is used then the selection condition to be used may be a comparison between the value "17" and the distinct values that are stored as the attribute value information (e.g. if the distinct values are different from 17 then the first data block may not be selected for scanning in order to evaluate the query).

In case the attribute value information is generated for multiple data blocks of the data table, the attribute value information may be used to select a scan list of data blocks of multiple data blocks to be scanned. This may prevent unnecessary scanning of data blocks. In this case, all determined attribute value information may be grouped based on the respective used synopsis technique. Each group of the determined groups may be assigned a tag indicating the synopsis technique used for the group in order to generate the attribute value information. This may be advantageous as, in case of receiving a query on the attribute of the data table, the attribute value information may be processed group-by-group by reading the respective tag for interpreting the attribute value information of the group in accordance with the synopsis technique of the group to determine a scan list of data blocks to be scanned for evaluating the query. This may avoid reading the tag for each attribute value information (i.e. for each data block having the attribute value information) which may save processing resources.

Figure 3:
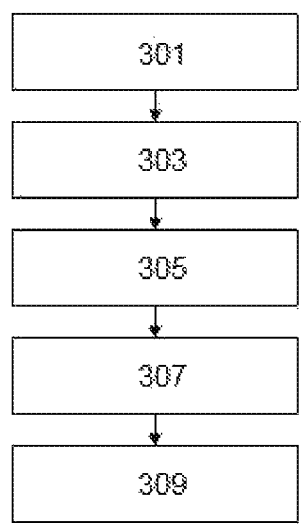
FIG. 3 is flowchart of a method for determining attribute value information using a histogram technique.

FIG. 3 is a flowchart of a method for determining the attribute value information of step 207 using a histogram technique of the synopsis techniques. The histogram technique may be selected among the synopsis techniques as described above.

In step 301, the first data block may be scanned and a fixed number j of first distinct values of the attribute may be identified. The identified distinct values may indicate a value range of the attribute in the first data block.

In step 303, the value range may be divided into multiple sub-ranges. The number of sub-ranges may be randomly chosen. In another example, the number of sub-ranges may be user defined.

In step 305, a histogram may be created that includes buckets each associated with a respective sub-range of the subranges.

In step 307, the first data block may be further scanned and for each further current value j+1 of the attribute it may be determined if a bucket is available (e.g. if it belongs to the bucket), and, if so, the bucket may be marked as a non-empty bucket (e.g. assigning a value different from zero to the non-empty bucket). If a current value is outside the determined range of values, it may be assigned to the first or the last bucket depending on whether the value is smaller than the lowest range value or higher than the highest range value of the histogram.

In step 309, the attribute value information may be provided or generated as including the extremum values of the attribute in the first data block, the histogram buckets, and the range of attribute values in each of the histogram buckets. Having both information may be used for processing a received query on the attribute of the data table. For example, it may be determined if the number of empty buckets of the histogram is smaller than a predetermined maximum number of empty buckets and, if so, the histogram buckets may be used for deciding to scan or not to scan the first data block for evaluating the query, otherwise the extremum values may be used instead.

In another example, the attribute value information may be provided or generated in step 309 as comprising the histogram buckets and the range of attribute values in each of the histogram buckets.

In the following, further details related to the synopsis techniques will be described for a given data block bN and attribute c, such as attribute 131B.

The default technique to approximate the extremum values that occur for an attribute (or in a column corresponding to the attribute) of the rows stored in a data block saves the smallest and largest value of the attribute in the data block. This may be performed if the value range of the data block is small and if there are few gaps in the value range (i.e. the number of gaps is smaller than a predefined number of gaps).

Computation: the extremum values may be computed on the fly using up to two comparisons against each incoming or scanned value. This computation may also be cheaply implemented in special hardware, such as FPGAs.

Usage: The extremum values may be used by default, unless a different technique is considered to provide higher benefits for query processing. Ranges defined by extremum values can be used for point and range predicates. However, range predicates (and in-list predicates as a special case for non-consecutive ranges) might return a large number of false positive results in case the data characteristics described of large gaps in the attribute value distribution of the data block.

Alternatively or in addition or to the extremum values, all values of the attribute that occur in bN may be stored in an "in-list" data entry associated with bN. This technique may be performed if the number of distinct values of c in bN is low (e.g. lower than the first predetermined threshold). In this case, the "in-list" technique may cope with gaps better than the extremum values. Thus, it does not matter which values are stored in bN, so that they can be very far from each other. Moreover, in-lists do not depend on an ordinal scale. They may reflect the occurring values on a nominal scale, which may circumvent the problems of false positives due to gaps in the value distribution of the attribute.

Computation: The in-list may be computed on the fly by memorizing all distinct values that have occurred so far. This can be done using a hash table or fixed-size array in main memory 110. As stated above, the in-list technique may be used for a low number of distinct values. Thus, the computer system may impose a fixed limit of k values that limits both the required memory during computation and the size of the resulting entry. When the computer system has observed k distinct values for c in bN and yet another value enters (e.g. scanned by) the computer system thus exceeding k, then the computer system discards the memory used for computing the in-list and decides not to use the in-list technique for bN.

An alternative approach to compute the in-list is to obtain the distinct values occurring in bN directly from a dictionary encoding scheme that comprises compressed data of bN. The encoding dictionary may be used that assigns every attribute value in the data block bN a certain code. Thus, the dictionary may contain all possible values in a data block.

The in-lists may also be implemented cheaply in special hardware, such as FPGAs. All that is required is memory or registers for k values and comparing every incoming value against each of them.

Usage: If the computation of an in-list not exceeding k distinct values succeeds, then the computer system uses the in-list technique for the entry of bN (e.g. for generating the attribute value information of c of bN and storing them in the entry of bN). It may support point and in-list predicates very efficiently and might also be used for range predicates if extremum values of are computed in addition to the in-list.

The in-lists may be used up to a certain size, as they require memory for every distinct value. A Bloom filter may provide a space-efficient probabilistic alternative. Fewer than 10 bits per value may be required for a 1% false positive probability. By dedicating a fixed number of bits (e.g., 64) in the entry of bN to a small Bloom filter, the values of c in bN may be approximated up to a number that is considerably larger than the limit of the in-list technique. By adding the extremum values, the value range of c in bN is further defined, which may particularly be useful for range queries.

Combining the extremum values with a small Bloom filter may address gaps in the value range. It may preferably be used for lower numbers of distinct values (but more than the limit of the in-list technique), such as within large min/max ranges of values of c within bN.

On the other hand, if the min/max range of values of c within bN is narrow and there are few gaps, then the extremum values may be used alone without the bloom filter.

Computation: A Bloom filter may be constructed on the fly by hashing every incoming value to a bit in a bit vector. If the employed hash functions are not overly complex, then this computation may not impose much overhead. A Bloom filter may also be implemented cheaply in special hardware, such as FPGAs.

If the computer system has pursued the in-list approach for some time until the k+1 value first occurred, the system may fall back to the Bloom filter approach by adding the k+1 values to a new Bloom filter and memorizing the extremum values before discarding the in-list. From this point on, the system adds all incoming (scanned) values to the Bloom filter without keeping track of the individual values, except for the smallest and largest values.

Usage: if there are too many distinct values for c in bN for the in-list technique, the system attempts the Bloom-filter technique instead. If nearly all bits of the Bloom filter's bit vector are set, then its filter effect degrades, so that the false positive rate may be close to the false positive rate obtained when using the extremum values alone. In this case, the computer system deletes the Bloom filter and falls back to the extremum values.

In-lists and Bloom filter technique may be used to approximate a discrete set of values. In scenarios with a high number of distinct values in a large min/max range, histogram buckets may be utilized since in-lists and Bloom filters may require too much memory for each entry of a data block, which must be capable of processing very quickly. In order to improve this situation, histogram buckets can be created to identify empty value ranges within the extremum values. The value range is thus divided into subranges, the histogram buckets. For every bucket the system records whether it contains values or not.

Computation: the buckets may be computed by memorizing a fixed number j of distinct values to approximate the value range of c in bN. For this, it is possible to exploit the distinct values computed for the in-list technique. At the j+1 value, the range between the smallest and largest value is divided into buckets and the j+1 known values are assigned to their bucket, which is marked "non-empty", and the smallest and largest value is kept. Then the j+1 values are deleted. Extra space (e.g. edge histogram bins or several extra "reserve" value ranges) for values outside the current range may be reserved as well. From this point on, the incoming or scanned values are only used to mark their respective subrange as "non-empty." Finally, the borders of the smallest and largest bucket are set to the extremum values of c in bN. Adjacent empty buckets and adjacent non-empty buckets may for example be merged.

Alternatively, only the extremum values of fixed number of n records can be computed to determine the initial value range. After it has been subdivided, the n values must be read again in order to distribute them over their buckets.

Up to a maximal number of buckets the buckets can also be computed cheaply in special hardware, such as FPGAs.

Usage: the buckets may be advantageous in particular if a significant fraction of them is empty. If the computer system detects that all (or nearly all) buckets are full, then the histogram buckets may not be very restrictive and the extremum values may be used instead. Thus, in this case, the computer system deletes the histogram buckets and falls back to the extremum values technique.

Furthermore, utilizing the feedback from querying may prove to be a useful technique. The synopsis techniques, other than the default technique, may optionally include the extremum values in their generated attribute value information. The difference between the extremum values and the other attribute value information, such as distinct values, may be in the false positive rate (i.e., in cases a technique is able to use its attribute value information to tell that a data block can be skipped where the extremum values could not). However, it depends on the query workload of the computer system whether or not the extra efforts of more advanced synopsis techniques pay off. Thus, the computer system may analyze the effectiveness of the attribute value information over a longer time frame as follows:

the computer system may count every scan that was able to skip a data block where the extremum values alone would not have been able to detect that this data block can be skipped; and the computer system may count every false positive. These are cases where a data block was scanned in vain, thus the additional effort did not pay off.

Using these two measures (per data block, per column or per table), the computer system may evaluate where the more advanced synopsis techniques actually improve scan performance. Only in those places, the computer system may 1) continue to create them and 2) keep them during the next data reorganization.

In another example, a computer-implemented method for processing a data table in a database management system is provided. The data table has at least a first attribute. The method includes: providing a set of synopsis techniques for determining attribute value information; storing a set of data rows in a current data block (e.g. a data block may be a physical storage unit or a fixed number of records); determining at least two pieces of attribute value information for the first attribute of the data rows stored in the current data block, each piece of attribute value information being calculated with a respective synopsis technique; determining a data characteristic describing the data rows stored in the current data block; selecting based on the data characteristics which one or ones of the at least two pieces of attribute value information are relevant for the current data block, resulting in selected attribute value information for the current data block; and storing the selected attribute value information for the current data block for supporting query processing against the data table.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for storing a data table, wherein the data table has at least one attribute, and wherein a first data block of the data table comprises a set of data rows of the data table, and wherein a current data block being the first data block, the method comprising:
   providing a plurality of synopsis techniques for determining a plurality of attribute value information indicative of the at least one attribute;
   determining a data characteristic describing the plurality of data rows of the current data block;
   selecting, based on the determined data characteristic, at least one synopsis technique of the provided plurality of synopsis techniques suitable for generating the plurality of attribute value information for the at least one attribute of the current data block;
   determining the plurality of attribute value information for the at least one attribute of the plurality of data rows of the current data block using the at least one selected synopsis technique, wherein determining the plurality of attribute value information further comprises:
      scanning the current data block to identify a fixed number j from a plurality of first distinct values of the at least one attribute for indicating a value range of the at least one attribute in the current data block;
      dividing the value range into a plurality of sub-ranges; and
      creating a distribution of a plurality of buckets, wherein each bucket is associated with a respective sub-range of the plurality of sub-ranges;
   storing the determined plurality of attribute value information for the current data block to be used for query processing against the data table;
   further scanning the current data block;
   determining a bucket within the plurality of buckets is available for each further current value j+1 of the at least one attribute;
   marking the bucket as a non-empty bucket;
   providing the plurality of attribute value information as comprising a plurality of extremum values of the at least one attribute in the current data block, the distribution of the plurality of buckets, and the value range in each of the distribution of the plurality of buckets;
   receiving a query of the at least one attribute of the data table;
   determining a plurality of empty buckets within the distribution of the plurality of buckets;
   comparing the determined plurality of empty buckets with a predetermined maximum number; and
   using one of the distribution of the plurality of buckets and the plurality of extremum values to decide to scan or not to scan the current data block for evaluating the received query based on the compared plurality of empty buckets.

2. The method of claim 1, wherein the data characteristic comprises a plurality of distinct values of the at least one attribute, and wherein selecting the at least one synopsis technique further comprises:
   comparing the plurality of distinct values with a predetermined threshold; and
   selecting the at least one synopsis technique based on a result of comparing the plurality of distinct values with the predetermined threshold.

3. The method of claim 2, further comprising:
   in response to determining that the plurality of distinct values is smaller than the predetermined threshold, selecting an in-list technique of the provided plurality of synopsis techniques, wherein determining the plurality of attribute value information comprises providing the plurality of attribute value information as the plurality of distinct values of the at least one attribute.

4. The method of claim 3, wherein the plurality of attribute value information is stored in a memory, and wherein the predetermined threshold comprises a maximum number of a plurality of memory units.

5. The method of claim 2, further comprising:
   in response to determining that the plurality of distinct values is higher than the predetermined threshold, selecting a bloom filter technique within the provided plurality of synopsis techniques, wherein determining the plurality of attribute value information comprises inserting each value of the at least one attribute of the current data block into a bit of a bit vector, and wherein the plurality of attribute value information comprises at least the bit vector.

6. The method of claim 5, wherein the plurality of attribute value information further comprises a plurality of extremum values of the at least one attribute.

7. The method of claim 1, wherein the plurality of synopsis techniques comprising a default synopsis technique for providing the plurality of attribute value information as the plurality of extremum values of the at least one attribute of the plurality of data rows of the current data block, and wherein the method further comprises:
   assigning to each synopsis technique of the plurality of synopsis techniques, other than the default synopsis technique, a selection criterion to be fulfilled by a plurality of values of the at least one attribute in order to use each synopsis technique, wherein selecting the at least one synopsis technique comprises, in response to determining the selection criterion is not fulfilled, selecting the default synopsis technique.

8. The method of claim 1, further comprising:
   assigning a tag to each technique of the plurality of synopsis techniques;
   storing the assigned tag of the at least one selected synopsis technique in association with the plurality of attribute value information;
   receiving a query on the at least one attribute of the data table;
   reading the stored tag to interpret the plurality of attribute value information in accordance with the at least one selected synopsis technique; and
   using the plurality of attribute value information for deciding to scan or not scan the current data block for evaluating the received query.

9. The method of claim 1, wherein a second plurality of data blocks of the data table comprise a respective second plurality of data rows of the data table, the method further comprising:
   repeating, for each of the second plurality of data blocks, at least one of providing the plurality of synopsis techniques, determine the data characteristic, selecting at least one synopsis technique, determining a plurality of attribute value information, and storing the determined plurality of attribute information;
   grouping a resulting plurality of attribute value information of the first and second data blocks based on a respective at least one synopsis technique;

assigning to each group a tag indicating the at least one synopsis technique used for the group;

receiving a query of the at least one attribute of the data table; and using the plurality of attribute value information group-by-group by reading the tag corresponding to each group for interpreting the plurality of attribute value information of the group in accordance with the at least one synopsis technique of the group to determine a scan list of the plurality of data blocks to be scanned for evaluating the query.

10. The method of claim 1, wherein the method is executed on a hardware component of a computer system, and wherein the hardware component comprises a field-programmable gate array.

11. The method of claim 1, wherein determining the data characteristic is performed using a plurality of metadata descriptive of an overall structure of the data table.

12. The method of claim 1, wherein the plurality of synopsis techniques comprises an in-list technique, a Bloom filter technique, and a default technique; and wherein providing the plurality of synopsis techniques, determine the data characteristic, selecting at least one synopsis technique, determining a plurality of attribute value information, and storing the determined plurality of attribute information are performed while scanning, row-by-row, the current data block, and further comprising:

assigning a counter to the at least one attribute;

for a current scanned row:

inserting a value of the at least one attribute of a current row into a bit of a bit vector;

updating the determined data characteristic, wherein the determined data characteristic comprises the counter and a plurality of filled bits of the bit vector;

determining the value of the at least one attribute of the current row is a distinct value;

comparing the assigned counter with a predefined maximum number of a plurality of distinct values;

if the counter is smaller than the predefined maximum number of the plurality of distinct values, the method further comprises:

saving the distinct value in a memory storage;

incrementing the assigned counter by a predefined value; and if the current row is a last row of the current data block, selecting the in-list technique;

if the counter is higher than the predefined maximum number of the plurality of distinct values, the method further comprises:

discarding the stored distinct values from the memory storage;

if the plurality of filled bits in the bit vector is smaller than a predetermined maximum number of the plurality of bits and if the current row is the last row of the current data block, selecting the Bloom filter technique;

if the plurality of filled bits in the bit vector is higher than the predetermined maximum number of the plurality of bits; and providing the plurality of attribute value information using the at least one selected synopsis technique.

13. The method of claim 12, further comprising:

in response to determining the range of the plurality of values is smaller than a maximum window of the plurality of values of the at least one attribute and a plurality of gaps is smaller than a predetermined maximum number of the plurality of gaps, selecting a default technique of the provided plurality of synopsis techniques, wherein determining the plurality of attribute value information comprises providing the plurality of attribute value information as a plurality of extremum values of the at least one attribute in the current data block.

14. The method of claim 1, wherein a range of a plurality of values of the at least one attribute comprises a plurality of sub-ranges separated by a plurality of gaps, and wherein each sub-range of the plurality of sub-ranges covers a second plurality of values of the at least one attribute that are part of the current data block, and wherein each gap of the plurality of gaps covers a third plurality of values of the at least one attribute that are not part of the current data block, and wherein the determined data characteristic is selected from a group consisting of a plurality of distinct values and the plurality of gaps.

* * * * *